United States Patent [19]
Dykstra et al.

[11] Patent Number: 5,704,328
[45] Date of Patent: Jan. 6, 1998

[54] METHOD TO CONTROL A SHORT RUNNER BYPASS VALVE IN THE INTAKE MANIFOLD OF AN INTERNAL COMBUSTION ENGINE

[75] Inventors: Gregory J. Dykstra, Grosse Pointe Woods; Brian J. Nelson, Royal Oak; Glen Tallarek, Grosse Pointe Woods, all of Mich.

[73] Assignee: Chrysler Corporation, Auburn Hills, Mich.

[21] Appl. No.: 725,278

[22] Filed: Oct. 2, 1996

[51] Int. Cl.$^6$ ............................ F02M 35/10; F02M 51/00
[52] U.S. Cl. ........................... 123/184.55; 123/184.53
[58] Field of Search .................... 123/184.21, 184.55, 123/184.53, 184.27, 184.47

[56] References Cited

U.S. PATENT DOCUMENTS

| | | | |
|---|---|---|---|
| 4,765,285 | 8/1988 | Kobayashi | 123/184.55 |
| 4,898,144 | 2/1990 | Kobayashi et al. | 123/184.55 |
| 5,197,433 | 3/1993 | Dykstra et al. | 123/350 |
| 5,211,139 | 5/1993 | Houle et al. | 123/184.55 |
| 5,309,883 | 5/1994 | Pischke | 123/184.55 |
| 5,438,964 | 8/1995 | Breidenbach | 123/184.55 |
| 5,596,966 | 1/1997 | Elder | 123/184.55 |

FOREIGN PATENT DOCUMENTS

| | | | |
|---|---|---|---|
| 59-173519 | 10/1984 | Japan | 123/184.55 |
| 2160264 | 12/1985 | United Kingdom | 123/184.55 |

*Primary Examiner*—David A. Okonsky
*Attorney, Agent, or Firm*—Mark P. Calcaterra

[57] ABSTRACT

According to the present invention, a system for controlling a runner system in an internal combustion engine is provided which optimizes the available torque output over a broad range of engine speeds. The system generally includes opening or closing a short runner bypass valve system according to changes in engine speed. More particularly, the method comprises sensing a speed of an engine, determining a current open/closed mode of a short runner bypass valve system, calculating a time to a short runner bypass valve system switch point, including compensating for a time period required to switch between open and closed modes, and switching the short runner bypass valve open/closed mode at a given time if the current open/closed mode is not equal to a desired mode.

14 Claims, 10 Drawing Sheets

METHOD TO CONTROL A SHORT RUNNER BYPASS VALVE IN THE INTAKE MANIFOLD OF AN INTERNAL COMBUSTION ENGINE

BACKGROUND OF THE INVENTION

1. Technical Field

The present invention generally relates to air flow systems for internal combustion engines. More particularly, the present invention relates to a method for controlling a short runner bypass valve system in an intake manifold of an internal combustion engine.

2. Discussion

It is generally known in the art of internal combustion engines that the length of the runners between the plenum and the cylinders within an intake manifold affect the available power or torque output over a range of engine speeds. For instance, high torque output can be obtained at low engine speeds by using relatively long runners. Also, relatively short runners provide high torque output at high engine speeds. However, the torque output drops off quickly at higher RPM levels with long runners alone. Additionally, short runners do not provide high torque at lower RPM levels. Thus, it is desirable to provide a runner system which maximizes the available torque output throughout an entire range of engine speed, including both low and high RPM levels.

Accordingly, there is a need in the art to provide an induction system for internal combustion engines which utilizes long runners at low RPM levels and both long and short runners at high RPM levels for optimizing torque output over a broad range of engine speeds. Furthermore, there is a need to provide a system for switching the short runners between open and closed modes which anticipates the occurrence of a runner switch point so that the system compensates for the finite mount of time required for switching the short runners between an open and a closed mode.

SUMMARY OF THE INVENTION

According to the present invention, a system for controlling a runner system in an internal combustion engine is provided which optimizes the available torque output over a broad range of engine speeds. The system generally includes opening or closing a short runner bypass valve system according to changes in engine speed. More particularly, the system comprises sensing a speed of an engine, determining a current open/closed mode of the short runner bypass valve system, calculating a time to a short runner bypass valve system switch point, including compensating for a time period required to switch between open and closed modes, and switching the short runner bypass valve open/closed mode at a given time if the current open/closed mode is not equal to a desired mode.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

Figure 1:
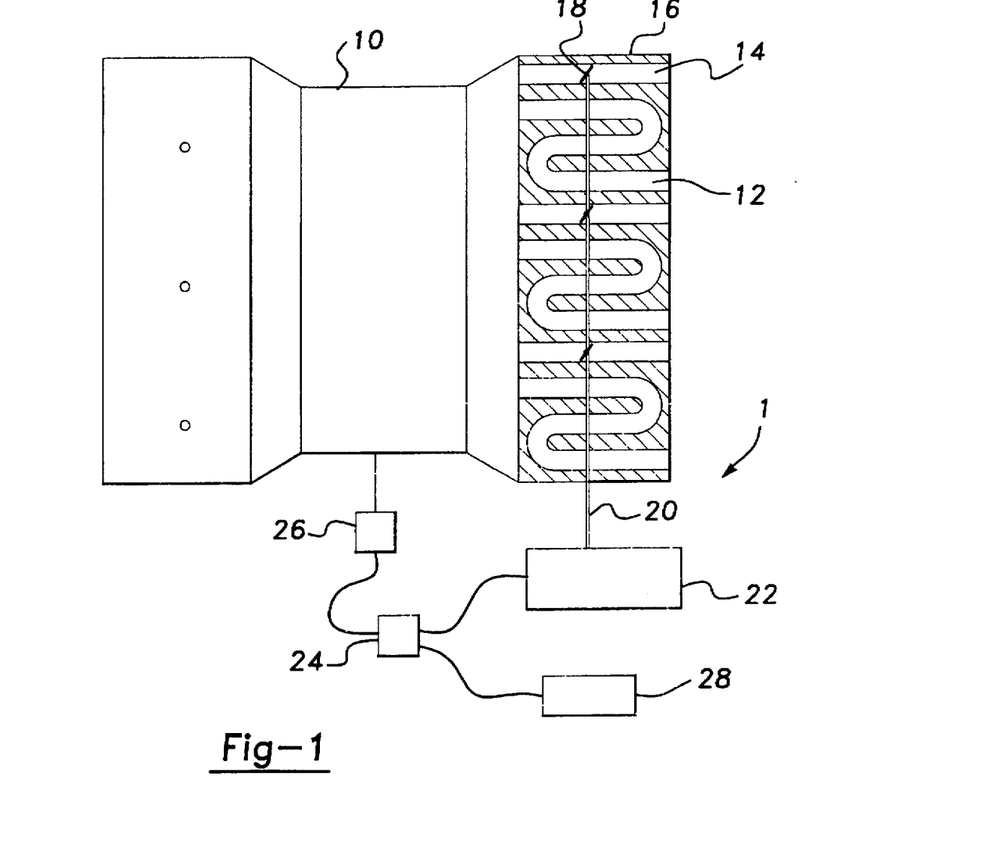
FIG. 1 is a schematic diagram of a hardware system for controlling a runner system of an internal combustion engine according to the present invention.

Referring to FIG. 1, a system for controlling a short runner bypass valve system is shown generally at 1. The short runner bypass system enables relatively long runners to be utilized independently during low engine speed operations and further enables relatively short runners to be utilized together with the long runners during high engine speed operations. Accordingly, the torque available from the engine is optimized over a broad range of engine speeds by a system including long and short runners which are employed at different times depending on engine speed. Furthermore, the present invention anticipates a time for a runner switch and compensates for the finite time required to switch between a short runner bypass open made and a chart runner bypass closed mode to optimize the available torque output from the engine.

Still referring to FIG. 1, an internal combustion engine is shown generally at 10. The internal combustion engine 10 includes an induction system for providing ambient air to the engine 10 to enable combustion therein. The induction system includes a combination of long runners 12 and short bypass runners 14 disposed within an intake manifold 16. A set of butterfly valves 18 are disposed within the short bypass runners 14 for opening and closing a passage extending therethrough.

A bar 20 runs centrally through the short runners 14 and is operably coupled to the butterfly valves 18. A motor 22 having a spring (not shown) therein holds the valves 18 closed when the motor 22 is not energized. In this state, i.e., when the valves 18 are closed, the system 1 is referred to as being in a closed mode since intake charge air is only permitted to flow through the long runners 12. When the motor 22 is energized, the valves 18 are moved by the bar 20 and held in an opened state. When the valves 18 are opened, the system 1 is referred to as being in an opened mode since intake charge air is permitted to flow through the short bypass runners 14 as well as the long runners 12.

Preferably, the short runner valves 18 are opened at a point above a predetermined engine speed. This point is generally when the throttle is in a "wide open" position. Further, the valves 18 are closed at a point below a second predetermined engine speed. This point is generally when the throttle is in a less than wide open position. The specific control methodology, to be described in greater detail below, compensates for the changing rate of engine speed, the finite time period required for opening or closing the valves 18 and hysteresis to prevent undesired valve dithering.

The control system 1 also includes an engine controller or electronic control unit (ECU) 24 for energizing the motor 22 to thereby vary the state of the valves 18. The ECU 24 includes a microprocessor, memory, (address, control, and data) bus lines, and other hardware and software to perform tasks of engine control. The control system 1 also includes a crankshaft speed sensor 26 electronically communicating with the ECU 24. The crankshaft speed sensor 26 is operably coupled to the internal combustion engine 10 for measuring the rotational speed of the crankshaft or engine 10.

The control system 1 also includes a throttle position sensor 28 connected to the ECU 24. The throttle position sensor 28 is coupled to a throttle (not shown) of the internal combustion engine 10 for sensing throttle position. It should be appreciated that the control system 1 may include other hardware and software to carry out or perform the short runner valve control methodology to be described.

Figure 2:
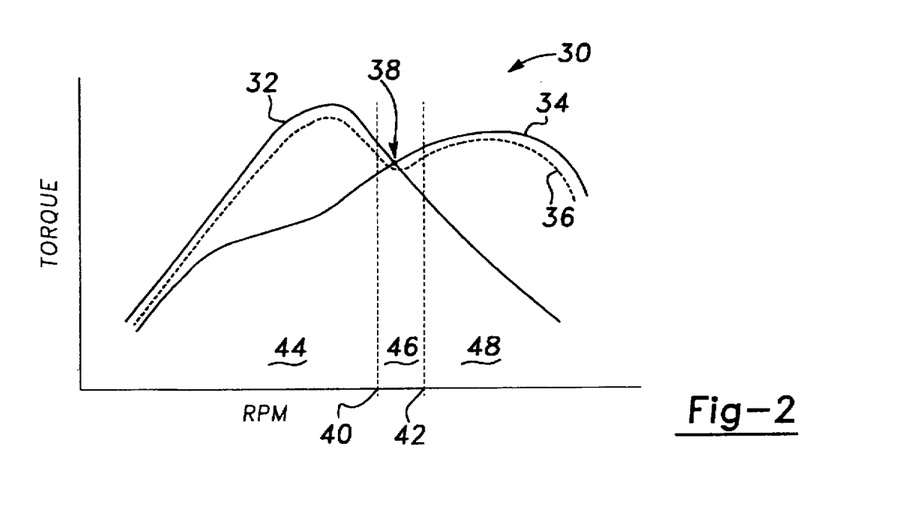
FIG. 2 is a graph of engine torque output versus engine speed as provided through use of long runners alone, long runners and short runners together, and the optimal output that is possible when the system is controlled according to the present invention.

Referring to FIG. 2, a graph of engine torque output versus engine speed for the internal combustion engine 10 is shown at 30. The graph includes a curve 32 representing long runner tuning, a curve 34 representing combined long runner and short runner tuning, and a curve 36 representing optimal tuning. The graph also includes a point 38 where the curve 32 and curve 34 intersect. The point of intersection 38 represents the desired engine speed for switching the short runner bypass system between open and closed modes. This point minimizes undesirable results that occur when the mode is changed at other points and the torque output of the engine jumps from one curve to the other.

According to the present invention, two switch points 40, 42 are implemented to provide a hysteresis region 46 which provides adequate system stability and minimizes the possibility of excessive mode switching (dithering) when the engine speed is near the point of intersection 38. The low speed switch point 40 demarks the low speed region 44 from the hysteresis region 46. The high speed switch point 42 demarks the high speed region 48 from the hysteresis region 46. Generally, the short runner valve system is in a closed mode when in the low speed region 44. Also, the short runner valve system is generally in an open mode when in the high speed region 48 so long as the throttle sensor 28 indicates that the throttle is wide open. In addition, the short runner valve system is generally held constant in either an open mode or a closed mode when in the hysteresis region 46. As will be described, the anticipatory short runner valve control methodology switches the short runner valves between open and closed positions to accomplish the optimal torque curve 36.

Figure 3:
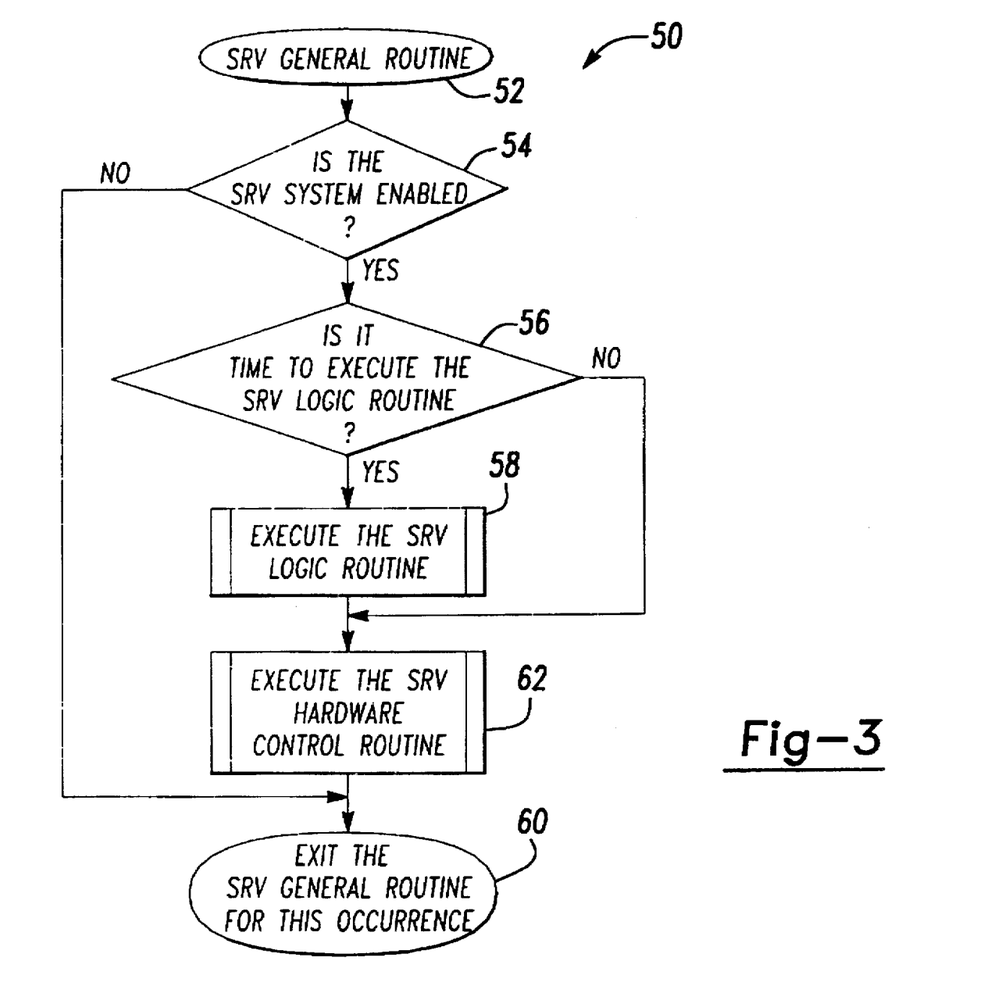
FIG. 3 is a flow chart of a general operation for controlling a short runner bypass valve system according to the present invention.

Referring now to FIG. 3, a flow chart of a general short runner valve (SRV) control system methodology 50, according to the present invention, is shown. The methodology enters at 52 and advances to a decision block 54. In the decision block 54, the methodology determines if the short runner valve system 1 is enabled. This is accomplished using configuration information stored in the memory of the ECU.

If the short runner valve system is enabled, the methodology advances to a decision block 56. However, if the short runner valve system 1 is disabled the SRV routine exits from the general operation at 60. It should be noted that if the enable conditions are not met at any time, the system operates to close the SRV.

Referring again to the decision block 56, the methodology determines if it is time to execute the short runner valve system logic operation. Whereas the short runner valve general operation is executed periodically, preferably once every 2 mS, the short runner valve logic operation is executed only once every Nth occurrence of the short runner valve general operation, preferably every fiftieth occurrence. Otherwise, the logic operation is bypassed.

If it is time to execute the short runner valve logic operation, the methodology advances from the decision block 56 to the block 58 for execution of the logic operation. The logic operation, to be described in greater detail below, analyzes the current engine operating conditions and determines when the short runner valves 18 should be opened or closed. If it is not time to execute the short runner valve logic operation at the decision block 56, or if the logic operation has been executed at the block 58, the methodology advances to a block 62 where the short runner valve hardware control operation is executed.

The short runner valve hardware control operation is executed once per occurrence of the short runner valve general operation. Thus, the hardware control operation is executed regardless of whether the short runner valve logic operation is executed. The hardware control operation, to be described in greater detail below, controls the input/output ports of the ECU 24 to vary the short runner valve system 1 between opened and closed modes. This is accomplished according to the schedule determined by the short runner valve logic operation.

Figure 4:
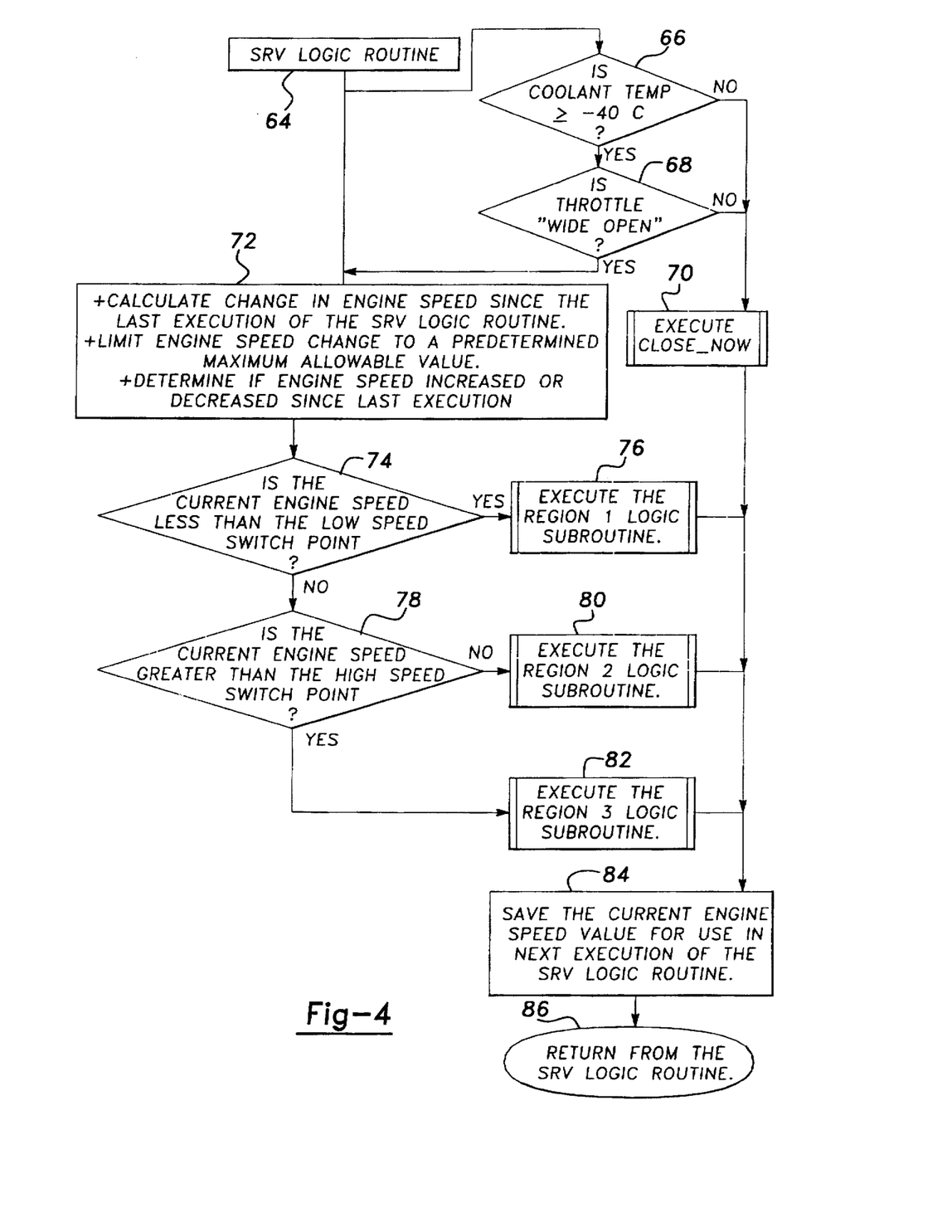
FIG. 4 is a flow chart of a logic operation for controlling a short runner bypass valve system according to the present invention.

Referring now to FIG. 4, the logic operation for controlling the short runner valve system 1 according to the present invention is shown in greater detail. The short runner valve logic operation enters through a block 64 and continues to a decision block 66 to determine if the coolant temperature has reached a desired level. This is accomplished by a coolant temperature sensor (not shown) sensing the temperature of the coolant. The coolant temperature sensor sends an appropriate signal to the ECU 24 so that the coolant temperature can be compared against a predetermined value equivalent to a minimum temperature. If the coolant temperature is greater than or equal to the desired temperature, for example, −40° C., the methodology 50 continues to a decision block 68. If not, the methodology 50 advances to a block 70 and advances to the close-now subroutine.

At the decision block 68, the methodology 50 determines if the position of the throttle is greater than or equal to wide open throttle (WOT). This is accomplished by the throttle position sensor 28 sensing the position of the throttle and sending an appropriate signal to the ECU 24 which is compared against a predetermined value such as 2.4 volts for WOT stored in memory. If the throttle is wide open, the methodology 50 continues to a block 72. If the throttle is not wide open the methodology 50 advances to the block 70 to execute the close-now subroutine.

Within the block 72, any change in engine speed since the last execution of the short runner valve logic operation is calculated. Although other methods are available, the engine speed is preferably calculated in the ECU 24 using the time intervals between engine crankshaft position pulses sensed by the crankshaft speed sensor 26. After a first engine speed is calculated, a change in engine speed is determined by comparing the current engine speed with the last engine speed.

At the block 72, the change in engine speed is limited to a predetermined maximum allowable value. The effect of limiting the calculated change in engine speed value to a maximum allowable value is to safeguard against any possible errors that would lead to unrealistically large engine speed change values which could lead to undesired changes in the short runner bypass valve mode. The logic operation at block 72 also determines if the engine is in an accelerating, decelerating, or steady condition according to the change in engine speed since the last execution. After determining any change in engine speed, the methodology continues to a decision block 74 where the current engine speed is compared to a short runner valve low engine speed switch point.

At the decision block 74, the methodology determines if the current engine speed is less than a short runner valve low engine speed switch point stored in the memory of the ECU 24. If the current engine speed is less than the low engine speed switch point, the methodology advances to a block 76 for further processing according to a first region logic sub-operation. If the engine speed in the block 74 is greater than or equal to the short runner valve low engine speed switch point, the methodology advances to a decision block 78, where the current engine speed is compared to a short runner valve high engine speed switch point. If the current engine speed is less than or equal to the high engine speed switch point, the methodology continues from the block 78 to a block 80 for additional processing according to a second region logic sub-operation. If the current engine speed is greater than the high engine speed switch point, the methodology advances to a block 82 for processing according to a third region logic sub-operation. Preferably, the current engine speed is compared against a predetermined value such as 5175 RPM for the short runner valve low engine speed switch point and 5225 RPM for the short runner valve high engine speed switch point stored in memory of the ECU 24.

From the blocks 76, 80, and 82, the methodology advances to a block 84 where the value corresponding to the current engine speed is saved to the memory of the ECU 24. This value is used in the next execution of the short runner valve logic operation for determining changes in engine speed. The methodology then continues to 86 where it exits the short runner valve logic operation.

Figure 5:
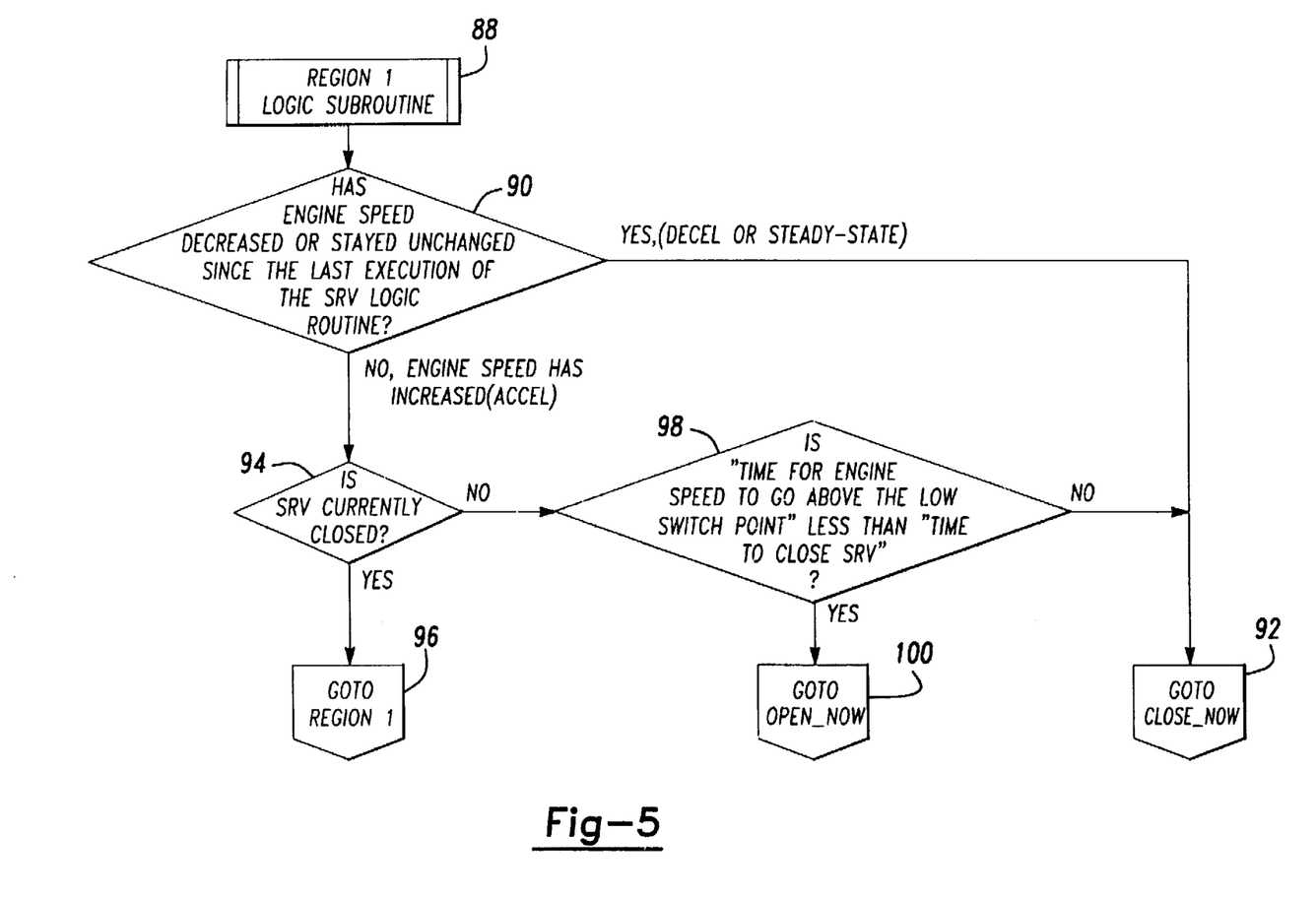
FIG. 5 is a flow chart of a first region logic sub-operation of the logic operation depicted in FIG. 4.

Referring now to FIG. 5, a more detailed view of a control methodology for the short runner bypass valve system 1, according to the first region logic sub-operation, is shown. In FIG. 5, the methodology enters through a block 88 and continues to a decision block 90. In the decision block 90, the methodology determines if the engine speed has decreased or remained constant since the last execution of the short runner valve logic operation. If the engine is steady or decelerating, the methodology advances to a goto block 92 where the methodology is advanced to a close-now sub-operation which is described in greater detail below.

If the engine speed has increased at the decision block 90, the methodology advances to a decision block 94 where the mode of the short runner valve system 1 is determined. If the short runner valve system 1 is in a closed mode, the methodology advances to a goto block 96. At the goto block 96, the methodology continues with the first region sub-operation as shown in FIG. 6.

If the short runner valve system 1 is in an open mode at the decision block 94, the methodology advances to a decision block 98 where the time period required for the engine speed to reach the short runner valve low engine speed switch point is compared to a predetermined valve equal to the time required to change the short runner valve system 1 from an open mode to a closed mode. If the lime period required for the engine speed to reach the short runner valve low engine speed switch point is less than or equal to the time required to switch the short runner valve system 1 to a closed mode, the methodology advances to a goto block 100 for execution of an open-now sub-operation which is described in greater detail below. If the time period required for the engine speed to reach the low engine speed switch point is greater than the time required to switch the short runner valve system 1 from an opened mode to a closed mode, the methodology advances to the goto block 92 for execution of the close-now sub-operation.

Also, at the decision block 98 the short runner valve system 1 should generally be in a closed mode. However, if the SRV system in an open mode and if the engine speed is close enough to the criteria required for execution of the second region logic sub-operation, the methodology configures the short runner valve system 1 to remain in an open mode. If not, the short runner valve system 1 is switched to a closed mode.

Figure 6:
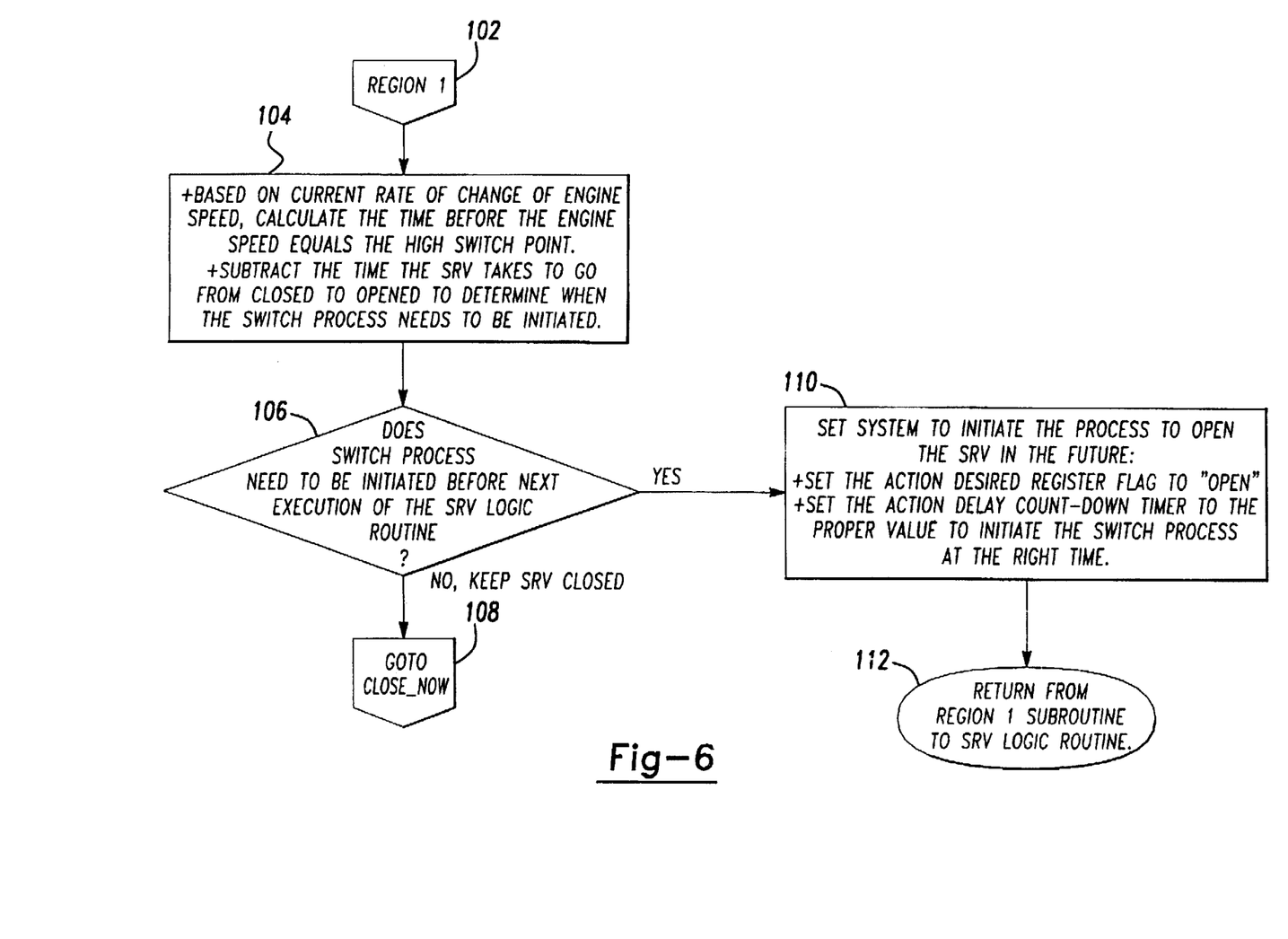
FIG. 6 is a continuation of the first region logic sub-operation of FIG. 5.

Referring now to FIG. 6, a continuation of the first region sub-operation is shown in greater detail. The methodology enters through an open block 102 from the goto block 96 (FIG. 5) and advances to a block 104. At the block 104, the methodology calculates the time period required for the engine speed to reach the short runner valve system high engine speed switch point. It should be appreciated that this calculation is based on the change in engine speed as described above. After calculating the time period required for the engine speed to reach the high engine speed switch point, the methodology subtracts the time period required for the short runner valve system 1 to switch from a closed mode to an opened mode to determine a time for the switch process to be initiated.

From the block 104, the methodology advances to a decision block 106 where it is determined whether the switch process needs to be initiated prior to the next execution of the short runner valve logic operation. The switch process is initiated when the time period for executing the logic operation is less than the time period to a runner system switch point. If the switch process does not need to be initiated before the next short runner valve logic operation, the methodology continues to a goto block 108 for execution of the close-now sub-operation which operates to keep to runner system 1 in a closed mode. If the switch process needs to be initiated before the next short runner valve logic operation, the methodology advances to a block 110 where further system parameters are set.

In the block 110, the short runner valve system 1 is set to initiate the process for switching the short runner valve system 1 to an open mode. An action desired register flag is set to "open" and an action delay count-down timer in the memory of the ECU 24 is set to the proper value to initiate the switch process at the correct time. After setting these parameters, the methodology advances to 112 where it exits the short runner valve first region logic sub-operation.

Figure 7:
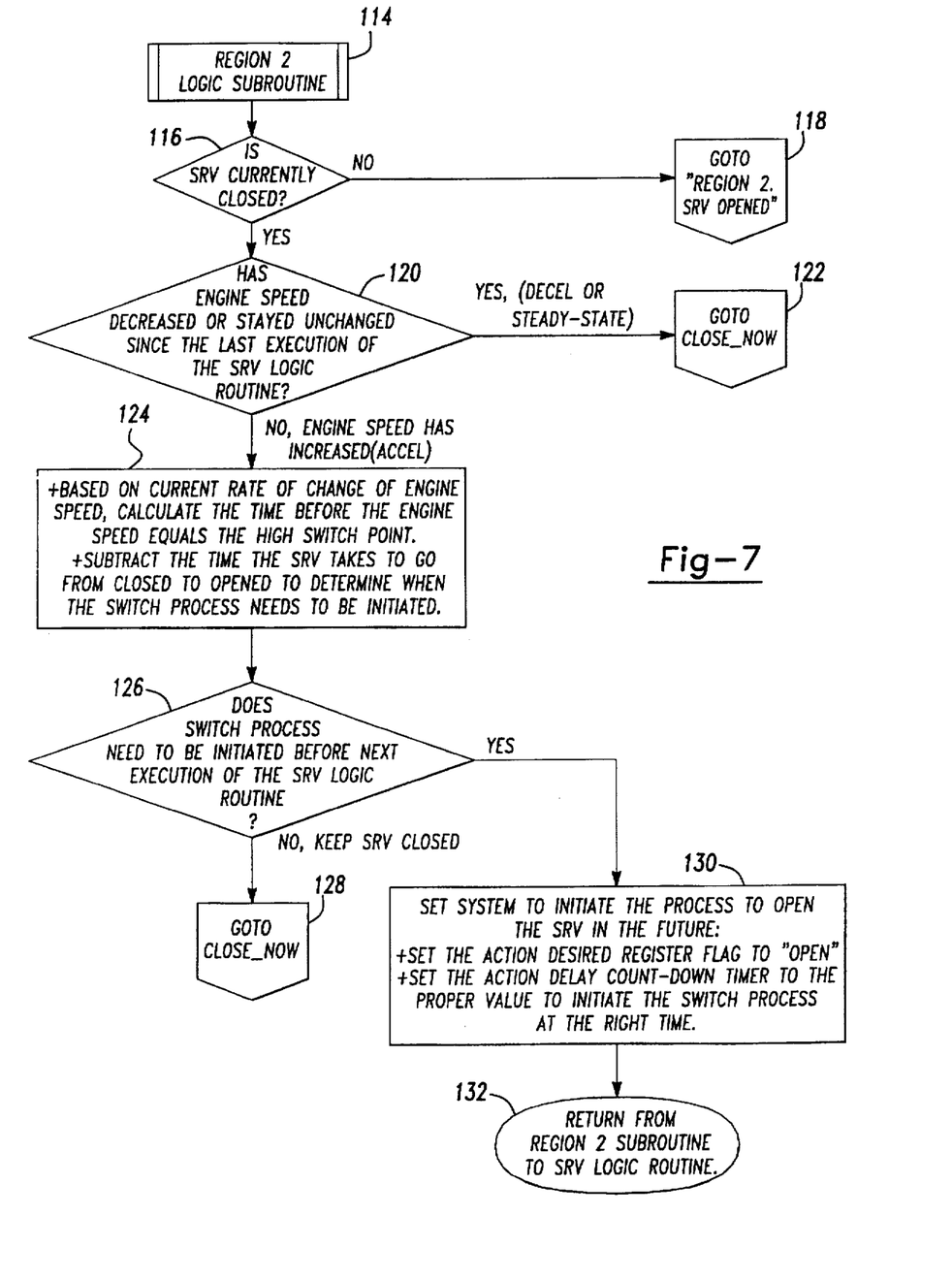
FIG. 7 is a flow chart of a second region logic sub-operation of the logic operation depicted in FIG. 4.
Figure 8:
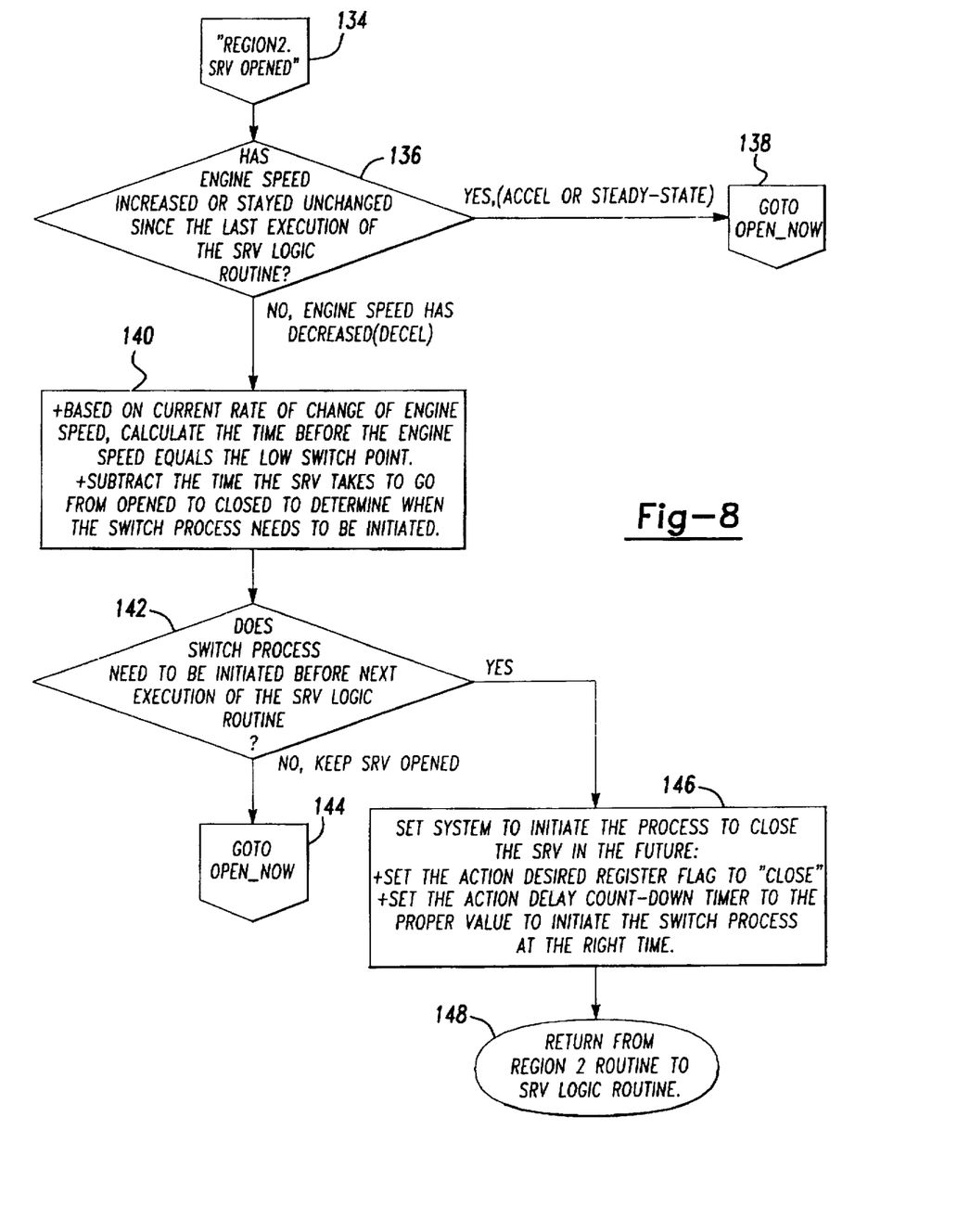
FIG. 8 is a continuation of the second region logic sub-operation of FIG. 7.

Referring now to FIG. 7, a second region logic sub-operation is shown in greater detail. The methodology enters through a block 114 and advances to a decision block 116 where the mode of the short runner valve system 1 is determined. If the short runner valve system 1 is in an open mode, the methodology advances to a goto block 118 where the second region logic sub-operation is continued as shown in FIG. 8. If the short runner valve system 1 is in a closed mode at the decision block 116, the methodology advances to a decision block 120.

At the decision block 120, the methodology determines if the engine speed has decreased or remained steady since the last execution of the short runner valve logic operation. If the engine is steady or decelerating, the methodology advances to a goto block 122 where the methodology advances to the close-now sub-operation. If the engine speed has increased at the decision block 120, the methodology advances to a block 124 where the methodology calculates the time period required for the engine speed to reach the short runner valve system high engine speed switch point. This calculation is based on the change in engine speed as described above. After calculating the time period required for the engine speed to reach the high engine speed switch point, the methodology subtracts the time period required for the short runner valve system 1 to switch from a closed mode to an open mode to determine a time for initialing the switch process.

From the block 124, the methodology advances to a decision block 126 where it is determined whether the switch process needs to be initiated prior to the next execution of the short runner valve logic operation. If the switch process does not need to be initiated before the next short runner valve logic operation, the methodology continues to a goto block 128 for execution of the close-now sub-operation. If the switch process does need to be initiated before the next short runner valve logic operation, the methodology advances to a block 130 where further system parameters are set.

In the block 130, the short runner valve system 1 is set to initiate the process for switching the short runner valve system 1 to an open mode. The action desired register flag is set to "open" and the action delay count-down timer in the memory of the ECU 24 is set to the proper value to initiate the switch process at the correct time. After setting these parameters, the methodology advances to 132 where it exits the short runner valve second region logic sub-operation.

Referring now to FIG. 8, a continuation of the second logic sub-operation is shown. The methodology enters through an open block 134 from the goto block 118 (FIG. 7) and advances to a decision block 136. At the decision block 136, the methodology determines if the engine speed has increased or stayed unchanged since the last execution of the short runner valve logic operation. If the engine is steady or accelerating, the methodology advances to a goto block 138 where the methodology advances to the open-now sub-operation. If the engine speed has decreased at the decision block 136, the methodology advances to a block 140 where the methodology calculates the time period required for the engine speed to reach the short runner valve system low engine speed switch point. After calculating the time period required for the engine speed to reach the low engine speed switch point, the methodology subtracts the time period required for the short runner valve system 1 to switch from an open mode to a closed mode to determine when the switch process should be initiated.

From the block 140, the methodology advances to a decision block 142 where it is determined whether the switch process needs to be initiated prior to the next execution of the short runner valve logic operation. If the switch process does not need to be initiated before the next short runner valve logic operation, the methodology continues to a goto block 144 for execution of the open-now sub-operation. If the switch process needs to be initiated before the next short runner valve logic operation, the methodology advances to a block 146 where further system parameters are set.

In the block 146, the short runner valve system 1 is set to initiate the process for switching the short runner valve system 1 to a closed mode. The action desired register flag is set to "close" and the action delay count-down timer in the RAM of the ECU 24 is set to the proper value to initiate the switch process at the correct time. After setting these parameters, the methodology advances to a 148 where it exits the short runner valve second region logic sub-operation.

Figure 9:
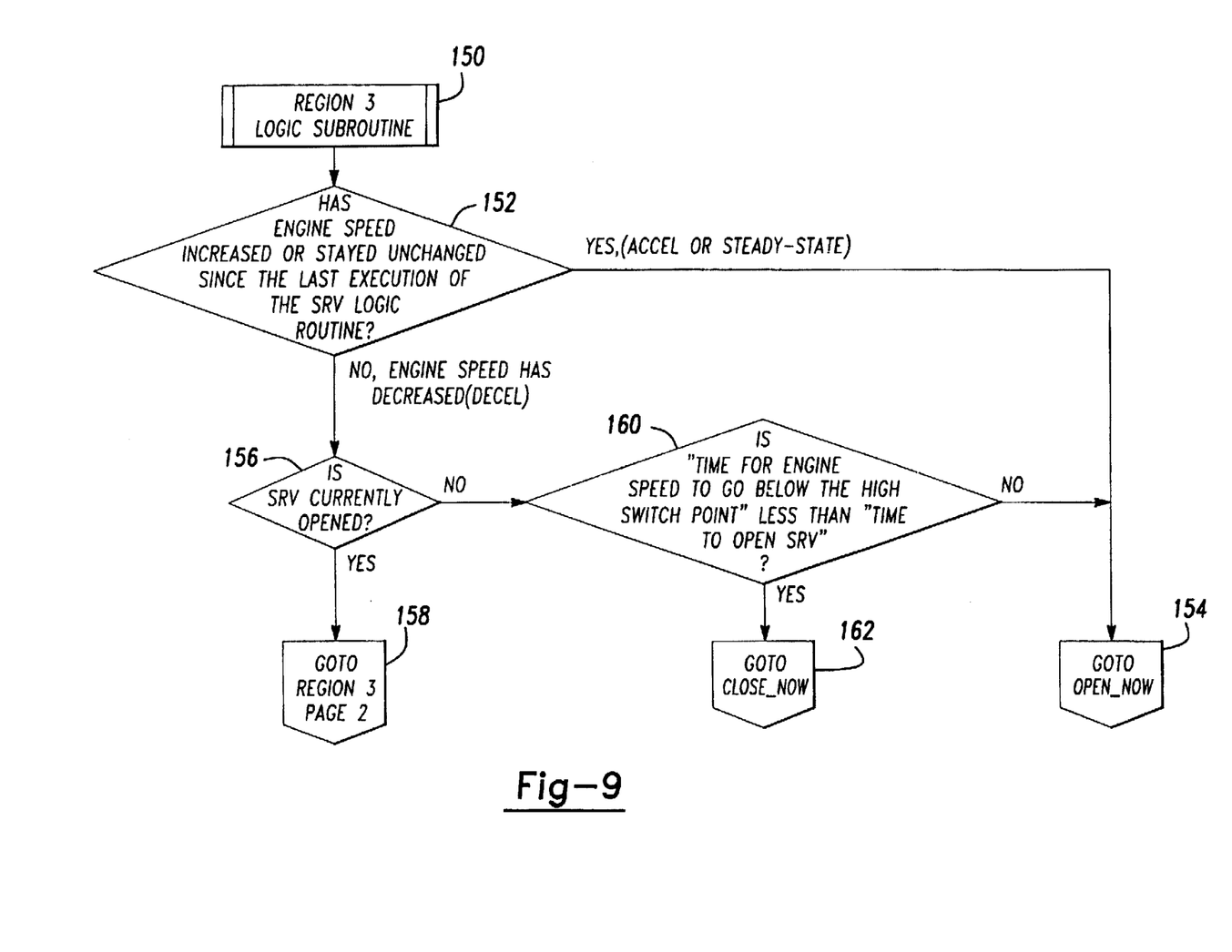
FIG. 9 is a flow chart of a third region logic sub-operation of the logic operation depicted in FIG. 4.

Referring now to FIG. 9, a more detailed view of a control methodology for the short runner bypass valve system 1, according to the third region logic sub-operation, is shown. In FIG. 9, the methodology enters through a block 150 and continues to a decision block 152. In the decision block 152, the methodology determines if the engine speed has increased or stayed the same since the last execution of the short runner valve logic operation. If the engine is steady or accelerating, the methodology advances to a goto block 154 where the methodology is advanced to the open-now sub-operation.

Figure 10:
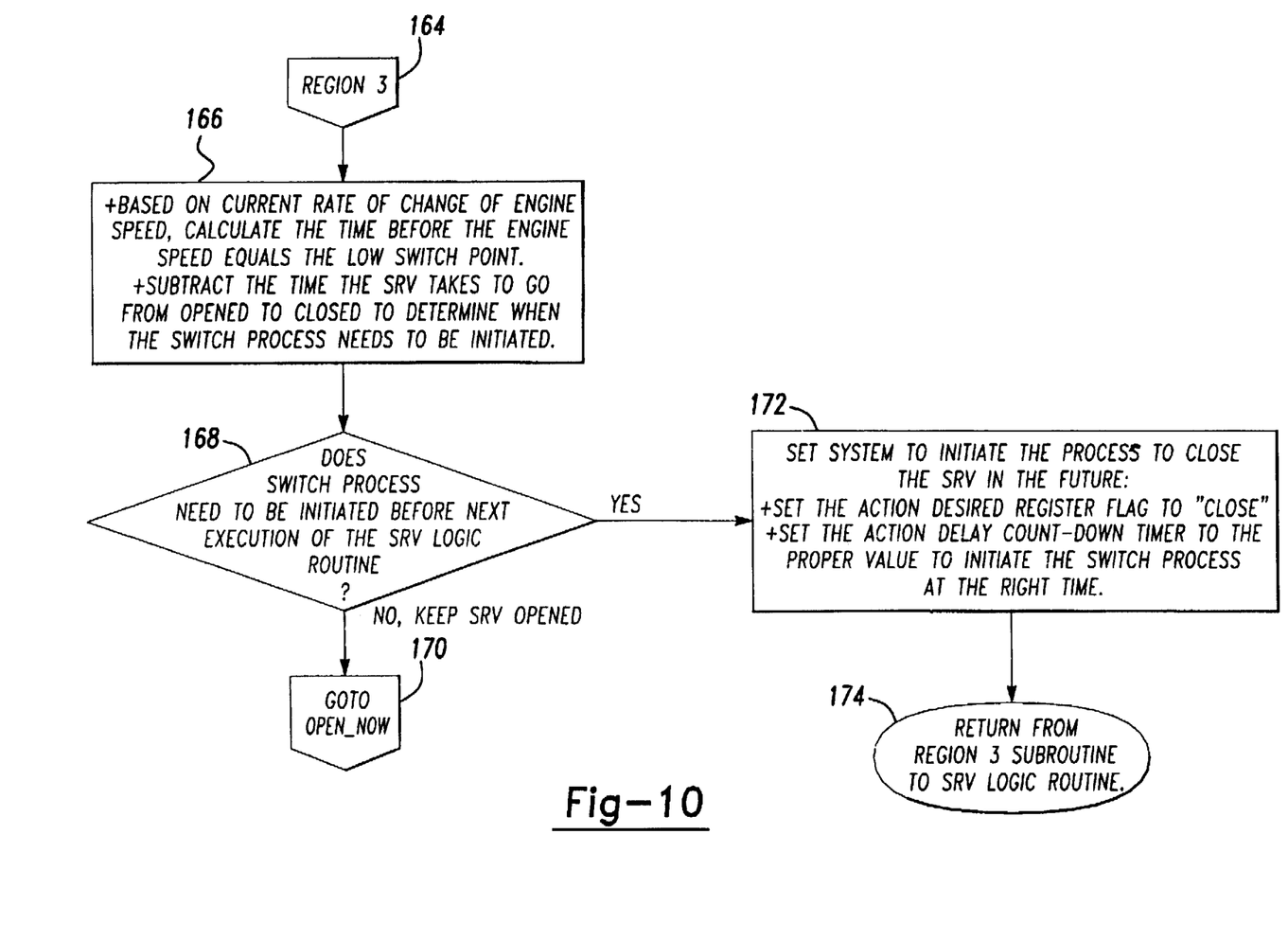
FIG. 10 is a continuation of the third region logic sub-operation of FIG. 9.

If the engine speed has decreased at the decision block 152, the methodology advances to a decision block 156 where the mode of the short runner valve system 1 is determined. If the short runner valve system 1 is in an open mode, the methodology advances to a goto block 140 where the methodology continues with the third region sub-operation as shown in FIG. 10. If the short runner valve system 1 is in a closed mode at the decision block 156, the methodology advances to a decision block 160 where the time period required for the engine speed to reach the short runner valve high engine speed switch point is compared to a predetermined value which is equal to the time required to change the short runner valve system 1 from a closed mode to an open mode.

If the time period required for the engine speed to reach the short runner valve high engine speed switch point is less than or equal to the time required to switch the short runner valve system 1 to an open mode, the methodology advances to a goto block 162 for execution of the close-now sub-operation. If the time period required for the engine speed to reach the high engine speed switch point is greater than the time required to switch the short runner valve system 1 from a closed mode to an opened mode, the methodology advances to the goto block 154 for execution of the open-now sub-operation.

At the decision block 160 the short runner valve system 1 should generally be in an open mode. However, if the SRV system is in a closed mode and if the engine speed is near enough to the criteria required for execution of the second region logic sub-operation, the methodology configures the short runner valve system 1 to remain in a closed mode. If not, the short runner valve system 1 is switched to an open mode.

Referring now to FIG. 10, a continuation of the third region sub-operation is shown. The methodology enters through an open block 164 from the goto block 158 (FIG. 9) and advances to a block 166. At the block 166, the methodology calculates the time period required for the engine speed to reach the short runner valve system low engine speed switch point. After calculating the time period required for the engine speed to reach the low engine speed switch point, the methodology subtracts the time period required for the short runner valve system 1 to switch from an open mode to a closed mode to determine a time for the switch process to be initiated.

From the block 166, the methodology advances to a decision block 168 where it is determined whether the switch process needs to be initiated prior to the next execution of the short runner valve logic operation. If the switch process does not need to be initiated before the next short runner valve logic operation, the methodology continues to a goto block 170 for execution of the open-now sub-operation. If the switch process needs to be initiated before the next short runner valve logic operation, the methodology advances to a block 172 where further system parameters are set.

In the block 172, the short runner valve system is set to initiate the process for switching the short runner valve system 1 to a closed mode. The action desired register flag is set to "close" and the action delay count-down timer in the memory of the ECU 24 is set to the proper value to initiate the switch process at the correct time. After setting these parameters, the methodology advances to 174 where it exits the short runner valve third region logic sub-operation.

Figure 11:
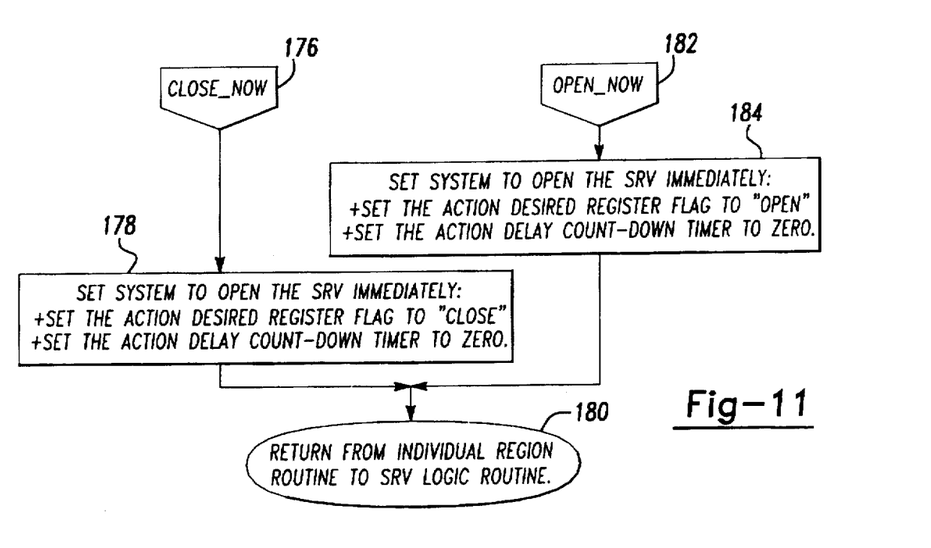
FIG. 11 is a flow chart of an open-now/close-now sub-operation of the first, second and third sub-operations.

Turning now to FIG. 11, the close-now and open-now sub-operations of the logic operation are shown in greater detail. The close-now sub-operation enters through an open block 176 and advances to a block 178 where various system parameters are set to close the short runner valve system 1 immediately. For instance, the action desired flag is set to "close" and the action delay count-down timer in the memory of the ECU 24 is set to zero. The methodology then advances to 180 where it exits the close-now sub-operation.

The open-now sub-operation enters through an open block 182 and advances to a block 184 where various system parameters are set to open the short runner valve system 1 immediately. For instance, the action desired flag is set to "open" and the action delay count-down timer in the RAM of the memory 24 is set to zero. The methodology then advances to 180 where it exits the open-now sub-operation.

Figure 12:
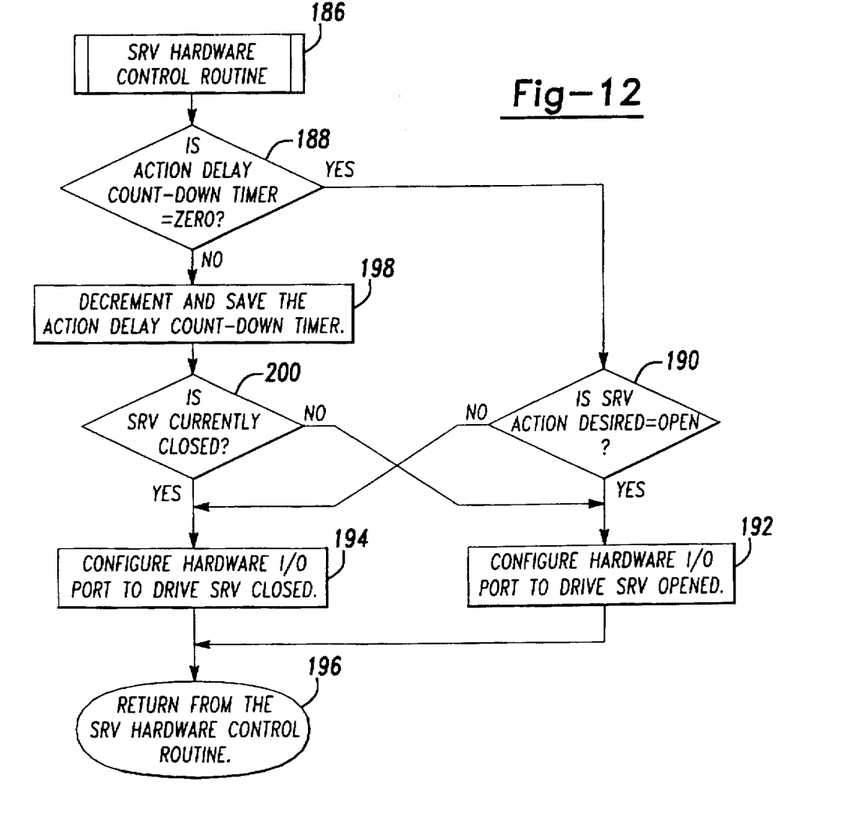
FIG. 12 is a flow chart of a hardware control operation for controlling a short runner bypass valve system according to the present invention.

Turning now to FIG. 12, the short runner valve hardware control operation is shown in greater detail. The methodology enters through a block 186 and advances to a decision block 188. At the decision block 188, the methodology determines if the action delay count down timer equals zero. If the action delay count down timer equals zero, the methodology advances to a decision block 190 where the methodology determines if the short runner valve action desired flag equals "open". If the short runner valve action desired flag equals "open", the methodology advances to a block 192 where the input/output ports of the ECU 24 are configured to drive the short runner valve system 1 to an open mode.

If the short runner valve action desired flag does not equal "open", the methodology advances to a block 194 where the input/output ports of the ECU 24 are configured to drive the short runner valve system 1 to a closed mode. The methodology continues from the blocks 192 and 194 to 196 where it exits the short runner valve hardware control operation.

Referring again to the decision block 188, if the action delay count down timer does not equal zero, the methodology advances to a block 198 where the action delay count down timer in the memory of the ECU 24 is decremented by the value one (1) and the new value of the action delay count-down timer is stored back to the memory. The methodology continues from the block 198 to a decision block 200 where it is determined if the short runner valve system 1 is currently in a closed mode. If the short runner valve system 1 is in a closed mode, the methodology advances to the block 194 where the input/output ports of the ECU 24 are configured to drive the short runner valve system 1 to a closed mode. If the short runner valve system 1 is not in a closed mode, the methodology advances to the block 192 where the input/output ports of the ECU 24 are configured to drive the short runner valve system 1 to an opened mode. The methodology continues from the blocks 192 and 194 to 196 where it exits the short runner valve hardware control operation.

Thus, it should be appreciated that the present invention provides a system for controlling a short runner bypass valve system which optimizes the available torque from an internal combustion engine throughout a broad range of engine speeds. At low engine speeds, the short runner valves are closed so that induction occurs only through the long runners to provide high torque output at low RPM levels. At high engine speeds, the short runner valves are opened so that induction occurs through both the long runners and the short runners to provide high torque output at high RPM levels. Thus, it is now possible to achieve increased torque output at both low RPM levels and high RPM levels in a single system. Also, the low available torque regions commonly associated with single length runner systems are avoided. Furthermore, the present invention compensates for the finite time required to switch the system between open and closed modes so that the transition from one torque curve to the other is as smooth as possible and the overall torque output is optimized.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method of setting a runner valve system including a plurality of long and short runners interconnecting a plenum and combustion chambers in an internal combustion engine between a desired mode and a non-desired mode comprising:

determining a current mode of said runner valve system;

calculating a time period to a runner valve system switch point including compensating for a time required to switch between said non-desired mode and said desired mode; and setting said runner valve system to said desired mode after the expiration of said time period if said current mode is not equal to said desired mode.

2. The method of claim 1 wherein said calculating step further comprises:

determining an accelerating, decelerating or steady state of said internal combustion engine;

determining a current engine speed of said internal combustion engine; and comparing said state of said internal combustion engine and said current engine speed with at least one runner valve system engine speed switch point.

3. A method of controlling a runner system including a plurality of long and short runners interconnecting a plenum and combustion chambers in an internal combustion engine comprising:

determining if a current engine speed is less than a first pre-selected engine speed, greater than or equal to said first runner system engine speed switch point and/or less than or equal to a second pre-selected engine speed, or greater than said second pre-selected engine speed;

determining an accelerating, decelerating, or steady state of said internal combustion engine;

determining a time period until said runner system should be switched between an open mode and a closed mode; and setting said runner system to a desired mode at the expiration of said time period based on said current engine speed and said state of said internal combustion engine.

4. The method of claim 3 wherein said time period includes compensating for a switching time required to switch said runner system between said open mode and said closed mode.

5. The method of claim 3 wherein, when said current engine speed is less than said first preselected engine speed, said setting step further comprises:

causing said runner system to operate in said closed mode if said engine is in a decelerating or steady state;

causing said runner system to operate in said closed mode if said engine is in an accelerating state, said runner system is in said opened mode and a first time period required for said engine speed to reach said first pre-selected engine speed is greater than or equal to a second time period required to switch said runner system from said opened mode to said closed mode;

causing said runner system to operate in said open mode if said engine is in said accelerating state, said runner system is in said open mode and said first time period is less than said second time period;

causing said runner system to operate in said closed mode if said engine is in said accelerating state, said runner system is in said closed mode and a third time period required for said engine speed to reach said second pre-selected engine speed, including a fourth time period required for said runner system to switch from said closed mode to said open mode, is greater than a fifth predetermined time period; and causing said runner system to operate in said open mode at a given time if said engine is in said accelerating state, said runner system is in said closed mode and said third time period is less than or equal to said fifth predetermined time period.

6. The method of claim 5 wherein said fifth predetermined time period corresponds to a time period required for executing a runner system logic operation.

7. The method of claim 5 wherein said given time corresponds to a count down register counting down one of said first and third time periods.

8. The method of claim 3 wherein, when said current engine speed is greater than said first pre-selected engine speed and less than said second pre-selected engine speed, said setting step further comprises:

causing said runner system to operate in said open mode if said runner system is in said open mode and said engine is in an accelerating or steady state;

causing said runner system to operate in said open mode if said runner system is in said open mode, said engine is in said decelerating state and a first time period required for said engine speed to reach said first pre-selected engine speed, including a second time period required for said runner system to switch from said open mode to said closed mode, is greater than a third predetermined time period;

causing said runner system to operate in said closed mode at a given time if said runner system is in said open mode, said engine is in said decelerating state and said first time period is less than or equal to said third predetermined time period;

causing said runner system to operate in said closed mode if said runner system is in said closed mode and said engine is in a decelerating or steady state;

causing said runner system to operate in said closed mode if said runner system is in said closed mode, said engine is in said accelerating state and a fourth time period required for said engine speed to reach said second pre-selected engine speed switch point, including a fifth time period required for said runner system to switch from said closed mode to said open mode is greater than said third predetermined time period;

causing said runner system to operate in said open mode at said given time if said runner system is in said closed mode, said engine is in said accelerating state and said fourth time period is less than or equal to said third predetermined time period.

9. The method of claim 8 wherein said third predetermined time period corresponds to a time period required for executing a runner system logic operation.

10. The method of claim 8 wherein said given time corresponds to a count down register counting down one of said first and fourth time periods.

11. The method of claim 3 wherein, when said current engine speed is greater than said second pre-selected engine speed, said setting step further comprises:

causing said runner system to operate in said open mode if said engine is in an accelerating or steady state;

causing said runner system to operate in said open mode if said engine is in a decelerating state, said runner system is in said closed mode and a first time period required for said engine speed to reach said second pre-selected engine speed is greater than a second time period required to switch said runner system from said closed mode to said opened mode;

causing said runner system to operate in said closed mode if said engine is in said decelerating state, said runner system is in said closed mode and said first time period is less than said second time period;

causing said runner system to operate in said open mode if said engine is in said decelerating state, said runner system is in said open mode and a third time period required for said engine speed to reach said first pre-selected engine speed, including a fourth time period required for said runner system to switch from said open mode to said closed mode is greater than a fifth predetermined time causing said runner system to operate in said closed mode at a given time if said engine is in said decelerating state, said runner system is in said open mode and said third time period is less than or equal to said fifth predetermined time period.

12. The method of claim 11 wherein said fifth predetermined time period corresponds to a time period required for executing a runner system logic operation.

13. The method of claim 11 wherein said given time corresponds to a count down register counting down one of said first and third time periods.

14. The method of claim 1 further comprising:

storing said time period to a register; and counting down said register to a pre-selected value equal to said expiration of said time period.

* * * * *